(12) United States Patent
Orsley (10) Patent No.: US 8,907,871 B2
(45) Date of Patent: Dec. 9, 2014

(54) TOUCH SCREEN ASSEMBLIES FOR ELECTRONIC DEVICES

(75) Inventor: Timothy J. Orsley, San Jose, CA (US)

(73) Assignee: Corning Incorporated, Corning, NY (US)

( * ) Notice: Subject to any disclaimer, the term of this patent is extended or adjusted under 35 U.S.C. 154(b) by 302 days.

(21) Appl. No.: 13/421,366

(22) Filed: Mar. 15, 2012

(65) Prior Publication Data

US 2013/0241841 A1   Sep. 19, 2013

(51) Int. Cl.
G09G 3/30       (2006.01)

(52) U.S. Cl.
USPC ............................................ 345/76; 345/173

(58) Field of Classification Search
None
See application file for complete search history.

(56) References Cited

U.S. PATENT DOCUMENTS

| | | | |
|---|---|---|---|
| 8,027,012 B2 | 9/2011 | Shimizu et al. | 349/158 |
| 2006/0132462 A1 | 6/2006 | Geaghan | 345/173 |
| 2009/0103040 A1* | 4/2009 | Shimizu et al. | 349/158 |
| 2009/0195511 A1 | 8/2009 | Cites et al. | 345/173 |
| 2009/0262290 A1 | 10/2009 | Sampica et al. | 349/122 |
| 2010/0072884 A1 | 3/2010 | Tchakarov et al. | 313/504 |
| 2010/0129666 A1 | 5/2010 | Logunov et al. | 428/426 |
| 2010/0156811 A1 | 6/2010 | Long et al. | 345/173 |
| 2011/0006999 A1 | 1/2011 | Chang et al. | 345/173 |
| 2011/0012842 A1 | 1/2011 | Lee et al. | 345/173 |
| 2011/0102361 A1 | 5/2011 | Philipp | 345/174 |
| 2011/0109591 A1 | 5/2011 | Kurokawa et al. | 345/175 |
| 2011/0115740 A1 | 5/2011 | Qian et al. | 345/174 |
| 2011/0309389 A1* | 12/2011 | Yu et al. | 257/89 |
| 2012/0308827 A1* | 12/2012 | Boek et al. | 428/410 |

FOREIGN PATENT DOCUMENTS

CN   101937285   1/2011

OTHER PUBLICATIONS

N. Yamamoto, et al., "Young's Modulus and Coefficient of Linear Thermal Expansion of ZnO Conductive and Transparent Ultra-Thin Films," Hindawi Publishing Corporation, *Advances in Materials Science and Engineering*, vol. 2011, Article ID 136217, pp. 1-10.
"Corning IOX-FS", Corning Incorporated, Product Information, Aug. 2011.
"Corning Gorilla Glass", Corning Incorporated, Product Information, Jul. 2011.
"Corning Gorilla Glass 2", Corning Incorporated, Product Information, Jan. 2012.
PCT/US2013/030854 International Search Report Apr. 2013.

* cited by examiner

*Primary Examiner* — Joseph Haley
*Assistant Examiner* — Ifedayo Iluyomade
(74) *Attorney, Agent, or Firm* — Kevin M. Able (57) ABSTRACT

In one embodiment, a touch screen assembly includes a sealing glass comprising ion-exchange strengthened glass having a first coefficient of thermal expansion $CTE_1$. The assembly may also include a backplane glass comprising ion-exchangeable glass having a device surface, an underside and a second coefficient of thermal expansion $CTE_2$, wherein $CTE_2$ is within $+/-15.0 \times 10-7/°$ C. of $CTE_1$. The device surface of the backplane glass is bonded and hermetically sealed to the underside of the sealing glass with a frit seal which encloses a device area between the underside of the sealing glass and the device surface of the backplane glass. An array of metal oxide thin film transistors may be deposited on the device surface of the backplane glass in the device area, wherein the array of metal oxide thin film transistors have a third coefficient of thermal expansion $CTE_3$ that is within $+/-15.0 \times 10-7/°$ C. of $CTE_2$.

19 Claims, 6 Drawing Sheets

TOUCH SCREEN ASSEMBLIES FOR ELECTRONIC DEVICES

BACKGROUND

1. Field

The present specification generally relates to touch screen assemblies for electronic devices and, more specifically, to touch screen assemblies with reduced thickness and improved durability and methods for making the same.

2. Technical Background

Touch screen assemblies are employed in both consumer and commercial electronic devices such as computer monitors, automated teller machines (ATMs) and the like. The "touch" activation of these assemblies necessitates that the assemblies be contacted by various objects including a user's fingers and/or stylus devices and, as such, the touch screen assemblies must be sufficiently robust to endure regular contact without damage. Moreover, touch screen assemblies may also be incorporated in portable electronic devices, such as mobile telephones, personal media players, and tablet computers. Such touch screen assemblies may be susceptible to damage during transport and/or use. Accordingly, touch screen assemblies for mobile electronic devices require enhanced strength to be able to withstand not only routine "touch" contact from actual use, but also incidental contact and impacts which may occur when the device is being transported.

Moreover, as touch screen assemblies are employed in more and more consumer electronic devices and, in particular, portable electronic devices, there is an increased demand for assemblies which are lighter in weight and more compact in size. Conventional touch screen assemblies commonly utilize three or sometimes even four glass substrates to create an assembly which is both mechanically robust and capable of maintaining a hermetic seal to prevent degradation of the light emitting elements. However, the use of three or even four glass substrates in the assembly may add to the overall thickness of the assembly making the assembly undesirable for some mobile applications.

Accordingly, a need exists for alternative touch screen assemblies which are mechanically robust and which have reduced thickness.

SUMMARY

The embodiments described herein relate to touch screen assemblies with improved mechanical durability and decreased thickness.

According to one embodiment, a touch screen assembly for an electronic device with improved mechanical durability and decreased thickness may include a sealing glass comprising ion-exchange strengthened glass having a first coefficient of thermal expansion $CTE_1$. A plurality of touch sensor electrodes may be formed on at least an underside of the sealing glass opposite a top surface of the sealing glass. The assembly may also include a backplane glass comprising ion-exchangeable glass having a device surface, an underside and a second coefficient of thermal expansion $CTE_2$, wherein $CTE_2$ is within $+/-15.0 \times 10^{-7}/°$ C. of $CTE_1$. The device surface of the backplane glass may be bonded and hermetically sealed to the underside of the sealing glass with a frit seal such that the frit seal encloses a device area between the underside of the sealing glass and the device surface of the backplane glass. The assembly may further include an array of metal oxide thin film transistors deposited on the device surface of the backplane glass in the device area and an array of OLED devices formed over the array of metal oxide thin film transistors in the device area on the device surface of the backplane glass.

In another embodiment, a touch screen assembly for an electronic device with improved mechanical durability and decreased thickness may include a sealing glass formed from ion-exchange strengthened alkali-alumino silicate glass which has a first coefficient of thermal expansion $CTE_1$ and a plurality of touch sensor electrodes formed on at least an underside of the sealing glass opposite a top surface of the sealing glass. The touch screen assembly further includes a backplane glass comprising alkali-alumino silicate glass having the same composition as the sealing glass, the backplane glass having a device surface which is free of alkali ions, and an underside. The device surface of the backplane glass is bonded and hermetically sealed to the underside of the sealing glass with a frit seal. The frit seal encloses a device area between the underside of the sealing glass and the device surface of the backplane glass. An array of metal oxide thin film transistors may be deposited on the device surface of the backplane glass in the device area and an array of OLED devices formed over the array of metal oxide thin film transistors in the device area on the device surface of the backplane glass.

In yet another embodiment, a touch screen assembly for an electronic device with improved mechanical durability and decreased thickness may include a sealing glass comprising ion-exchange strengthened glass having a depth of layer of at least 30 μm, a compressive stress greater than or equal to 500 MPa, and a first coefficient of thermal expansion $CTE_1$. The assembly may also include a backplane glass comprising ion-exchangeable glass having a device surface, an underside and a second coefficient of thermal expansion $CTE_2$ such that $CTE_2$ is within $+/-15.0 \times 10^{-7}/°$ C. of $CTE_1$ and. The device surface of the backplane glass is bonded and hermetically sealed to the underside of the sealing glass with a frit seal which encloses a device area between the underside of the sealing glass and the device surface of the backplane glass. An array of metal oxide thin film transistors may be deposited on the device surface of the backplane glass in the device area, wherein the array of metal oxide thin film transistors have a third coefficient of thermal expansion $CTE_3$ such that $CTE_3$ is within $+/-15.0 \times 10^{-7}/°$ C. of $CTE_2$.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2A:
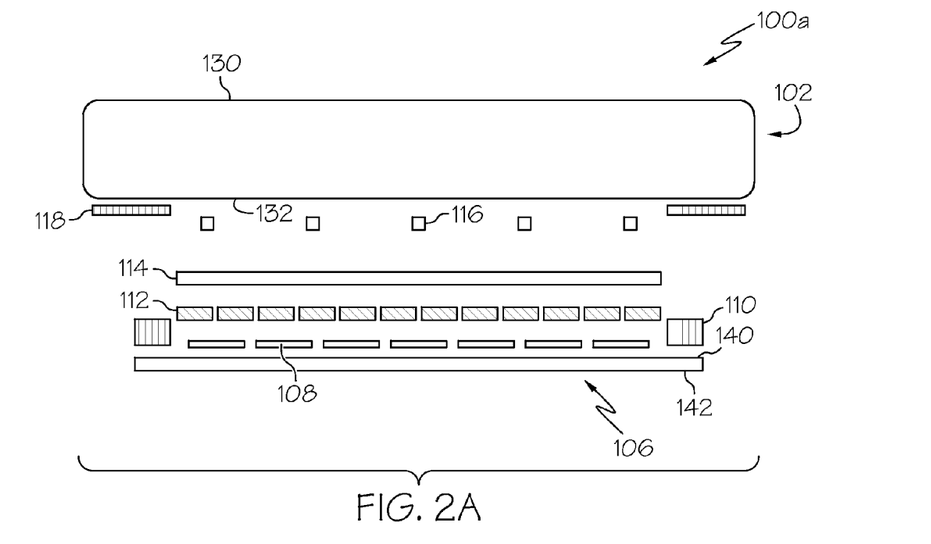
FIG. 2A schematically depicts an exploded cross sectional view of a touch screen assembly for an electronic device according to one embodiment shown and described herein.

Reference will now be made in detail to various embodiments of touch screen assemblies, examples of which are illustrated in the accompanying drawings. Whenever possible, the same reference numerals will be used throughout the drawings to refer to the same or like parts. An exploded cross sectional view of one embodiment of a touch screen assembly is shown in FIG. 2A. The touch screen assembly generally includes a sealing glass which is directly bonded and hermetically sealed to a backplane glass with a frit seal. In the embodiments described herein, the sealing glass is an ion-exchange strengthened glass and the backplane glass is an ion-exchangeable glass. The sealing glass includes a plurality of touch sensor electrodes formed on at least one of the underside or the top surface of the sealing glass. The backplane glass includes a plurality of metal oxide thin film transistors (MO-TFTs) deposited on a device surface of the backplane glass. Organic light emitting diodes (OLEDs) are positioned over and electrically coupled to the MO-TFTs to facilitate the emission of light through the sealing glass. Various embodiments of touch screen assemblies and methods of forming the same will be described in more detail herein with specific reference to the appended drawings.

Conventional OLED display assemblies typically utilize silicon thin film transistors which are deposited on a backplane substrate having a coefficient of thermal expansion (CTE) similar to that of the silicon thin film transistors such that, during elevated temperature processing, the differential expansion between the silicon thin film transistors and the backplane substrate is minimized. Further, to prevent degradation of the OLED material by oxidation due to exposure to humidity, environmental contaminants and the like, the backplane is generally hermetically sealed to a sealing glass. The sealing glass generally has a coefficient of thermal expansion similar to that of both the silicon thin film transistors and the backplane substrate such that the hermetic seal is not broken due to differential expansion between the backplane substrate and the sealing glass at operating and/or processing temperatures.

Silicon thin film transistors generally have a CTE of about 30 ppm. Accordingly, when glass is used for either the substrate and/or the sealing glass, the glass should have a CTE of approximately 30 ppm. However, ion-exchangeable glasses (such as alkali-alumino-silicate glasses) generally have a CTE greater than 30 ppm. As such, these glasses are not generally compatible for use as a substrate or sealing glass for devices employing silicon thin film transistors as the differential expansion between the ion-exchangeable glass and the silicon thin film transistors may result in damage to the silicon thin film transistors during manufacture of the device and/or subsequent use. Accordingly, in conventional OLED display assemblies, if an ion-exchange strengthened cover glass is desired, the ion-exchange strengthened cover glass is typically incorporated into the OLED display assembly as a separate component, in addition to the sealing glass and the substrate, thereby increasing the amount of material used in the assembly as well as the cost of the display and the overall thickness of the display.

By utilizing metal oxide thin film transistors (MO-TFTs) instead of silicon thin film transistors, the OLED touch screen assemblies described herein facilitate directly hermetically sealing an ion-exchange strengthened sealing glass to a backplane substrate formed from ion-exchangeable glass thereby eliminating the need for a separate ion-exchange strengthened cover glass and reducing the overall thickness of the touch screen assembly as well as the cost of the touch screen assembly.

Figure 1:
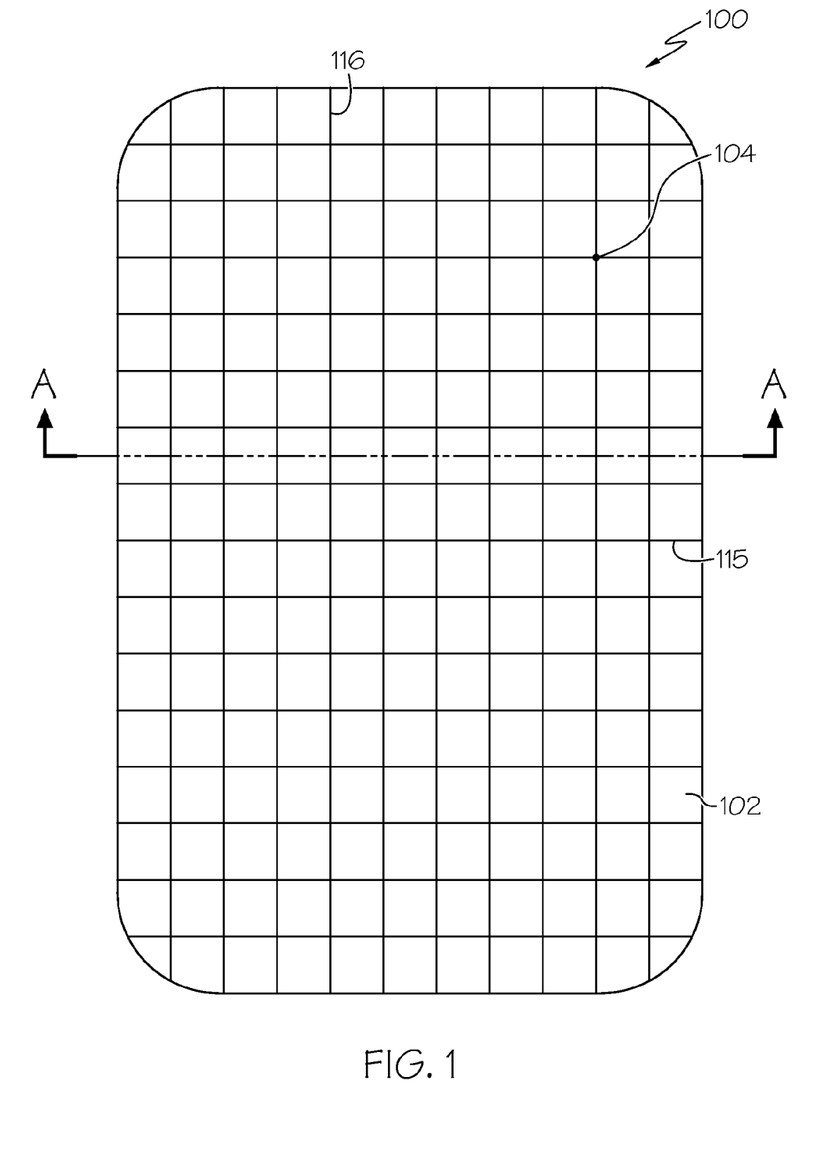
FIG. 1 schematically depicts a touch screen assembly for an electronic device according to one or more embodiments shown and described herein.

Referring now to FIG. 1, a top view of a touch screen assembly 100 is schematically depicted. The touch screen assembly 100 generally includes a plurality of touch sensitive sensors 104. The touch sensitive sensors 104 are formed by the intersection of column electrodes 116 and row electrodes 115 which are formed on either the top surface or underside of an ion-exchange strengthened sealing glass 102. The electrodes 115, 116 may be formed on the same side of the sealing glass 102 or on opposite sides of the sealing glass 102. The sealing glass 102 is, in turn, directly bonded and hermetically sealed to a backplane glass comprising ion-exchangeable glass. While the backplane glass is described herein as being formed from ion-exchangeable glass, the backplane glass need not be ion-exchange strengthened. Accordingly, it should be understood that, in the embodiments of the touch screen assemblies described herein, the backplane glass may be either ion-exchange strengthened glass or, alternatively, non-ion-exchange strengthened glass.

Figure 2B:
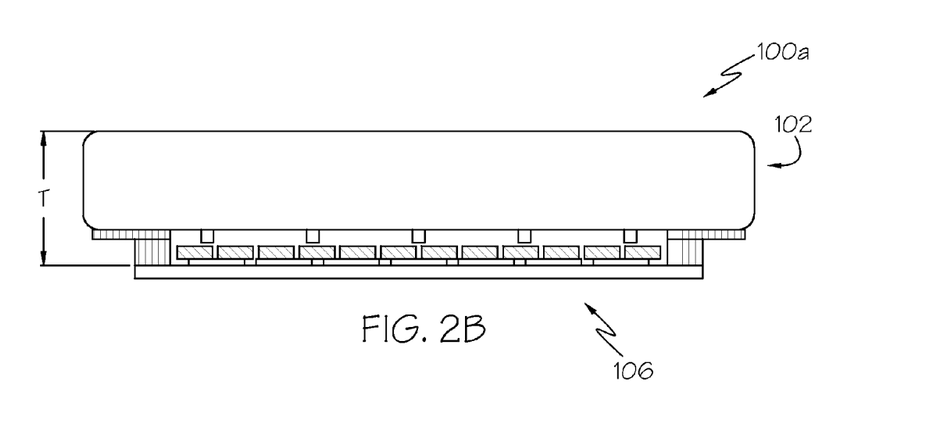
FIG. 2B schematically depicts the touch screen assembly of FIG. 2A as assembled.

Referring now to FIGS. 2A and 2B, exploded (FIG. 2A) and assembly (FIG. 2B) views of one embodiment of a touch screen assembly 100a are schematically depicted. In all the embodiments of the touch screen assemblies described herein, the touch screen assemblies include a sealing glass 102 which is directly bonded and hermetically sealed to a backplane glass 106 with a frit seal 110, as shown in FIGS. 2A and 2B. The sealing glass 102 is formed from an ion-exchange strengthened glass, such as an alkali-alumino silicate glass. Examples of suitable ion-exchange strengthened glass include, without limitation, ion-exchange strengthened Gorilla™ Glass and Gorilla™ Glass 2 manufactured by Corning, Inc. However, it should be understood that other ion-exchange strengthened glasses may be used for the sealing glass 102. The sealing glass 102 has a top surface 130 and an underside 132 each of which includes a layer of compressive stress which is imparted to the sealing glass 102 by ion exchange strengthening. The compressive stress extends from both the top surface 130 and the underside 132 of the sealing glass 102 into the thickness of the sealing glass. The compressive stress improves the mechanical strength of the sealing glass and generally mitigates failure of the sealing glass due to incidental damage (i.e., chips, scratches, or the like). In the embodiments described herein, the compressive stress in the sealing glass 102 is about 500 MPa or greater and a depth of layer (DOL) which is greater than or equal to about 30 μm. For example, in some embodiments, the compressive stress may be greater than or equal to 800 MPa or even greater than or equal to 950 MPa. In some embodiments, the DOL may be greater than or equal to about 40 μm or even greater than or equal to about 50 μm. The compressive stress and DOL are determined based on the stress birefringence of the glass as specified in ASTM Standard C1422.

In the embodiments described herein, the sealing glass 102 generally has a thickness $T_1$ which is less than or equal to about 1 mm. For example, the sealing glass 102 may have a thickness $T_1$ which is in a range from about 0.5 mm to about 1 mm. For example, the sealing glass 102 may have a thickness $T_1$ which is in a range from about 0.5 mm to about 0.7 mm. In one exemplary embodiment, the sealing glass 102 has a thickness $T_1$ of about 0.55 mm. In another exemplary embodiment, the sealing glass 102 has a thickness $T_1$ of about 0.7 mm.

Further, the sealing glass 102 has a first coefficient of thermal expansion $CTE_1$. In embodiments where the sealing glass is an alkali-alumino silicate glass, $CTE_1$ is in the range from about $75 \times 10^{-7}/°$ C. to about $100 \times 10^{-7}/°$ C. In one embodiment, $CTE_1$ is in the range from about $80 \times 10^{-7}/°$ C. to about $85 \times 10^{-7}/°$ C. For example, when the sealing glass 102 is formed from Gorilla™ Glass, $CTE_1$ is on the order of about $84.5 \times 10^{-7}/°$ C. from 0° C. to about 300° C. Alternatively, when the sealing glass 102 is formed from Gorilla™ Glass 2, $CTE_1$ is on the order of about $80 \times 10^{-7}/°$ C. from 0° C. to about 300° C.

The backplane glass 106 is formed from an ion-exchangeable glass, such as an alkali-alumino silicate glass, which has a coefficient of thermal expansion similar to that of the sealing glass 102 in order to facilitate bonding and hermetically sealing the backplane glass 106 to the sealing glass 102 with a frit seal 110. Specifically, in order to maintain the integrity of the hermetic frit seal between the backplane glass 106 and the sealing glass 102, the backplane glass 106 and the sealing glass 102 should have similar coefficients of thermal expansion such that the differential expansion between the backplane glass 106 and the sealing glass 102 is minimized as the temperature of the touch screen assembly 100 fluctuates during operation. Accordingly, in the embodiments described herein, the backplane glass 106 generally comprises ion-exchangeable glass which has a second coefficient of thermal expansion $CTE_2$ which is similar to that of the sealing glass 102. Specifically, the backplane glass 106 has a second coefficient of thermal expansion $CTE_2$ such that $CTE_2$ is within $+/-15.0 \times 10^{-7}/°$ C. of $CTE_1$ or even within $+/-10.0 \times 10^{-7}/°$ C. of $CTE_1$. For example, in one embodiment $CTE_2$ of the backplane glass 106 is the same as $CTE_1$ of the sealing glass 102 (i.e., $CTE_2 = CTE_1$). Accordingly, when the sealing glass is formed from alkali alumino silicate glass, as described above, it should be understood that $CTE_2$ of backplane glass 106 is generally in the range from about $75 \times 10^{-7}/°$ C. to about $100 \times 10^{-7}/°$ C. or even $80 \times 10^{-7}/°$ C. to about $85 \times 10^{-7}/°$ C. such that $CTE_2$ is similar to or the same as $CTE_1$. In some embodiments, the sealing glass 102 and the backplane glass 106 are formed from glasses which have the same composition in order to minimize the difference between the coefficients of thermal expansion of the sealing glass and the backplane glass. The phrase "the same composition," as used herein, refers to the composition of the backplane glass 106 and the composition of the sealing glass 102 prior to the sealing glass being ion-exchanged strengthened. Accordingly, in these embodiments, it should be understood that the composition of the backplane glass 106 differs from the composition of the sealing glass 102 in the assembled touch screen assembly 100 in that the backplane glass 106 does not include ions introduced into the glass by ion exchange. Further, it should also be understood that, in other embodiments, the sealing glass 102 and the backplane glass 106 need not be formed from glass with the same composition.

The term "ion-exchangeable glass" is used herein to describe the backplane glass 106 and means that the glass is amenable to ion-exchange strengthening by immersing the glass in a molten salt bath containing alkali ions to facilitate the exchange of larger alkali ions in the molten salt bath (such as potassium ions) with smaller alkali ions in the glass (such as sodium ions) such that a compressive stress is formed in the surfaces of the glass. However, it should be understood that the backplane glass need not be ion-exchange strengthened, only amenable to ion-exchange strengthening, such that the physical characteristics of the backplane glass 106 (specifically the CTE of the backplane glass) are similar to the physical characteristics of the sealing glass 102.

Accordingly, in some embodiments the backplane glass 106 is ion-exchangeable glass but is not ion-exchange strengthened while in other embodiments, the backplane glass 106 is ion-exchangeable glass which is also ion-exchange strengthened. Examples of suitable ion-exchangeable glass which is not ion-exchange strengthened include, without limitation, glasses having the same composition as Gorilla™ Glass and Gorilla™ Glass 2 manufactured by Corning, Inc. prior to exposing the glass to ion exchange. Examples of suitable ion-exchangeable glass which is ion-exchange strengthened include, without limitation, Gorilla™ Glass and Gorilla™ Glass 2 manufactured by Corning, Inc.

In embodiments wherein the backplane glass 106 is ion-exchange strengthened, the backplane glass 106 is only lightly ion exchange strengthened such that the compressive stress imparted to the backplane glass 106 is generally less than the compressive stress in the sealing glass 102 and the DOL of the backplane glass 106 is generally less than the DOL of the sealing glass 102. In these embodiments, the compressive stress in the backplane glass is about 600 MPa or greater and has a depth of layer (DOL) which is less than or equal to about 40 μm. In some embodiments, the DOL may be less than or equal to about 35 μm or even less than or equal to about 30 μm.

In the embodiments described herein, the thickness $T_1$ of the sealing glass 102 is generally greater than the thickness $T_2$ of the backplane glass 106 and, as such the sealing glass 102 is primarily responsible for providing the mechanical strength to the touch screen assembly 100. Accordingly, the backplane glass 106 may be significantly thinner than the sealing glass 102. The thickness $T_2$ of the backplane glass 106 is generally less than about 0.5 mm. For example, in some embodiments, the backplane glass 106 may be less than or equal to about 0.4 mm or even less than or equal to about 0.3 mm. In other embodiments, the backplane glass 106 may be less than or equal to about 0.2 mm or even less than or equal to about 0.1 mm.

Figure 3A:
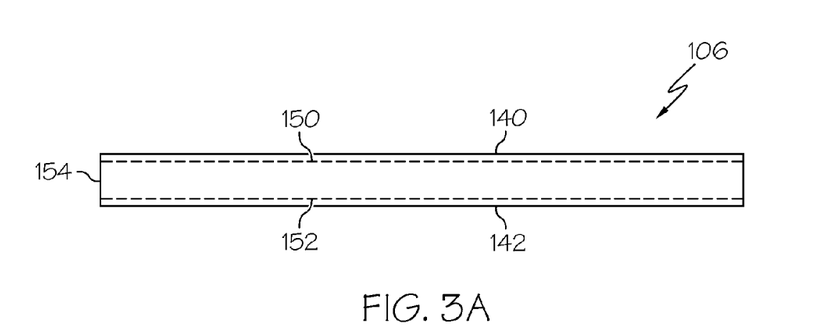
FIG. 3A schematically depicts a cross section of a dealkalized backplane glass for a touch screen assembly according to one embodiment described herein.
Figure 3B:
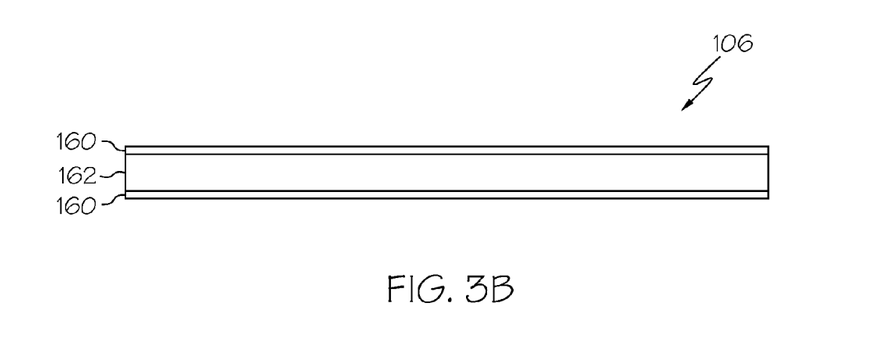
FIG. 3B schematically depicts a cross section of a laminated backplane glass for a touch screen assembly according to one or more embodiments shown and described herein.

Referring now to FIGS. 3A and 3B, the backplane glass 106 includes an underside 142 and a device surface 140 on which an array of MO-TFTs is deposited. In some embodiments, the backplane glass 106 is formed such that the device surface 140 and optionally, the underside 142, are free from alkali ions. Specifically, alkali ions in the device surface 140 may migrate or leach into the array of MO-TFTs deposited on the device surface 140 potentially damaging the MO-TFT array. Accordingly, to prevent such damage, at least the device surface 140 may be free from alkali ions.

Referring to FIG. 3A, in one embodiment, the backplane glass 106 includes an alkali free zone 150 formed in the device surface 140. Similarly, an alkali free zone 152 may be formed in the underside 142 of the backplane glass 106 such that an alkali containing core 154 is positioned between the alkali free zones 150, 152. In this embodiment, the alkali free zones 150, 152 may be formed by dealkalizing the backplane glass 106 by exposing one or more of the surfaces of the backplane glass to a dealkalizing agent such as, for example, a solid ammonium sulfate salt or a solution of ammonium sulfate salts.

Referring now to FIG. 3B, in another embodiment, the backplane glass 106 may be formed from a laminated glass structure such that the underside and the device surface are free from alkali ions. In this embodiment, an alkali containing core 162 is laminated between two layers of alkali-free cladding glass 160. The alkali containing core 162 is formed from an alkali-alumino silicate glass, as described above, while the cladding glass 160 is formed from an alkali-free glass such as, for example, Eagle™ glass manufactured by Corning, Inc. Such a lamination may be formed from a variety of different processes including, for example, a double-fusion draw process as disclosed in U.S. Pat. No. 4,214,886, which is incorporated herein by reference. In this embodiment, the CTE of the laminate structure is intermediate between the CTE of the cladding glass and the CTE of the core glass such that the overall CTE is still compatible with the CTE of the sealing glass 102. Because the alkali containing core 162 is disposed between two alkali-free cladding glasses 160, the laminated structure in not ion exchangeable. However, because the core glass contains alkali ions which render the core glass amenable to ion exchange, the laminated structure necessarily includes ion-exchangeable glass even though the laminated structure, taken in its entirety, may not be ion exchangeable.

Referring again to FIGS. 2A and 2B, use of ion-exchange strengthened glass for the sealing glass 102 and the backplane glass 106 is facilitated by the use of an array of MO-TFTs deposited on the backplane glass 106 of the touch screen assembly 100a. Specifically, the MO-TFTs have a third coefficient of thermal expansion $CTE_3$ which is greater than silicon-based TFTs and more similar to the coefficients of thermal expansion of the sealing glass 102 and the backplane glass 106. The coefficient of thermal expansion of the MO-TFTs varies with the thickness of the MO-TFTs and, as such, the coefficient of thermal expansion of the MO-TFTs can be "tuned" to be the same as or substantially similar to the coefficient of thermal expansion of the backplane glass 106. In some embodiments described herein, $CTE_3$ is within $+/-15.0 \times 10^{-7}/°$ C. of $CTE_2$ or even within $+/-10.0 \times 10^{-7}/°$ C. of $CTE_2$. In some embodiments, the array of MO-TFTs 108 is formed from indium gallium zinc oxide (IGZO). In some other embodiments, the array of MO-TFTs 108 is formed from zinc oxide. Use of MO-TFTs which have a coefficient of thermal expansion similar to the backplane glass 106 and the sealing glass 102 minimizes the differential expansion between these components during manufacture and subsequent use thereby minimizing damage to the TFTs and/or degradation of the display performance due to misalignment of various components as a result of the large differences in expansion during operation.

In the embodiments described herein, the array of MO-TFTs 108 and related components (i.e., the array of OLED devices and the like) are positioned on the device surface 140 of the backplane glass 106 and located within a device area which is bounded by the frit seal 110 such that the various components are hermetically sealed between the underside 132 of the sealing glass 102 and the device surface 140 of the backplane glass 106. In the embodiments described herein, the frit seal 110 is formed from a powdered glass frit which, when sintered, has a coefficient of thermal expansion similar to that of the sealing glass 102 and the backplane glass 106 to mitigate failure of the frit seal as a result of temperature fluctuations.

Still referring to the embodiment of the touch screen assembly depicted in FIGS. 2A and 2B, the touch screen assembly 100a further includes an array of OLED devices 112 which are formed over the array of MO-TFTs 108 and electrically coupled to the array of MO-TFTs 108 such that the each OLED in the array of OLED devices 112 is switched on and off with a corresponding transistor in the array of MO-TFTs 108. In the embodiment of the touch screen assembly 100a schematically depicted in FIGS. 2A and 2B, the array of OLED devices 112 comprises an array of top emitting red, green and blue (RGB) OLED devices such that each group of RGB OLED devices forms a pixel of the OLED display.

While the array of OLED devices has been described herein as comprising an array of top emitting RGB OLED devices, it should be understood that other configurations are contemplated. For example, it is generally understood that in OLED displays which utilize individual red, green and blue emitting OLED devices, differential aging of the different color OLEDs may occur resulting in a color shift over the life of the display. Moreover, forming such OLED displays may require the utilization of multiple shadow masks to facilitate the deposition of the differently colored OLED materials, thereby adding to the complexity of the manufacturing process. Accordingly, in an alternative embodiment (not shown), the array of OLED devices consists of top emitting white OLED devices which avoid the problems associated with using separate red, green and blue OLED devices. In this embodiment, a color filter may be positioned on the underside of the sealing glass to provide color to individually displayed pixels.

In another alternative embodiment (not shown), the array of OLED devices may comprise top emitting blue OLED devices to avoid the problems associated with using separate red, green and blue OLED devices. In order to facilitate the display of color, the touch screen assembly may further comprise an array of quantum dot sub-pixels positioned on an underside of the sealing glass. The quantum dot sub-pixels are positioned in metalized wells which reduce cross-talk between individual sub-pixels. Each sub-pixel in the array of quantum dot sub-pixels includes red and green quantum dot emitters and blue light scatterers. Accordingly, in this embodiment blue light emitted by the array of OLED devices is converted to red, green or blue light as the light passes through the array of quantum dot sub-pixels.

Further, in the embodiments described herein, an index-matching gel 114 (schematically shown as a rectangular block) is disposed between the array of OLED devices 112 and the underside 132 of the sealing glass 102 to compensate for the different refractive index of the space between the array of OLED devices 112 and the underside 132 of the sealing glass 102.

In the embodiments described herein, the touch screen assemblies further include a plurality of touch sensor electrodes. In the various embodiments of the touch screen assemblies depicted in FIGS. 2A-2B and 4A-6B, the touch screen assemblies utilize touch sensor electrodes 116 which are deposited on the underside of the sealing glass 102. In these embodiments, the touch screen electrodes may be formed from indium tin oxide (ITO). In this embodiment, both row and column electrodes are deposited on the underside 132 of the sealing glass 102 and a thin film of insulating material is deposited between the row and column electrodes. However, in other embodiments (not shown) cooperating pairs of touch sensor electrodes may be deposited on the top surface 130 and underside 132 of the sealing glass 102. In these embodiments, the touch sensor electrodes may be formed from indium tin oxide or similar materials such as, for example, aluminum zinc oxide.

In some embodiments, the touch sensor electrodes 116 may be interconnected with electrical traces formed from ITO. In other embodiments, the touch sensor electrodes 116 are interconnected with electrical traces formed from metallic materials, such as copper or aluminum, which can be substantially thinner (on the order of 5 μm) than the ITO traces. In these embodiments, the metallic traces may be additionally coated with a black mask, such as black chrome, to reduce specular reflectance, particularly for those electrical traces located on the underside of the sealing glass 102.

Still referring to FIGS. 2A and 2B, embodiments of the touch screen assemblies described herein may optionally include a perimeter frit 118 which is disposed between the underside 132 of the sealing glass 102 and the frit seal 110. The perimeter frit 118 may be colored such that the perimeter fit 118 not only bonds and hermetically seals the sealing glass 102 to the backplane glass 106, but also obscures the underlying components of the touch screen assembly. More specifically, conventional devices generally use an organic ink to obscure portions of the touch screen display assembly which are not within the display aperture. However, during manufacture of the assembly, these inks are easily damaged, particularly during laser processing of the frit seal 110. Thus, a perimeter frit 118 which functions both as a hermetic seal and a decorative embellishment could be used as an alternative to organic inks In embodiments where a perimeter frit 118 is utilized, the perimeter frit 118 must be thin (i.e., less than 10 μm) as the metallic traces connected to the touch sensor electrodes intersect with the perimeter frit 118 to interconnect with metal return lines which are disposed between the perimeter fit 118 and the frit seal 110.

Figure 4A:
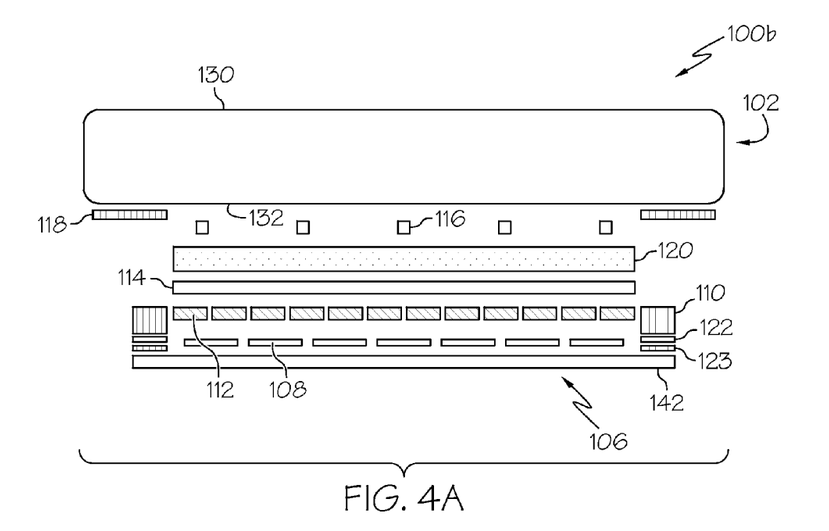
FIG. 4A schematically depicts an exploded cross sectional view of a touch screen assembly for an electronic device according to one embodiment shown and described herein.
Figure 4B:
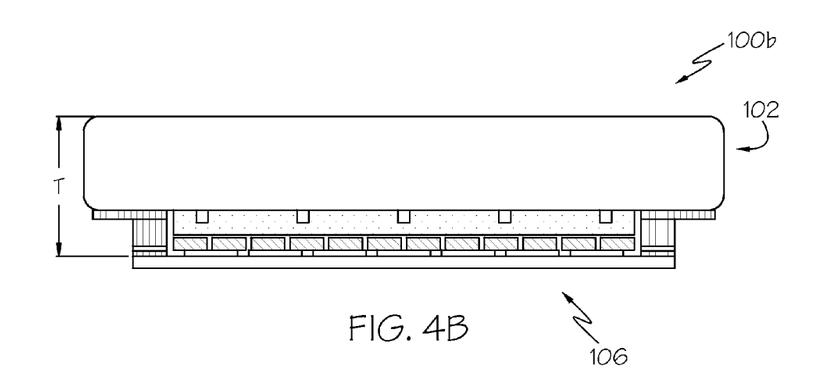
FIG. 4B schematically depicts the touch screen assembly of FIG. 4A as assembled.
Figure 5:
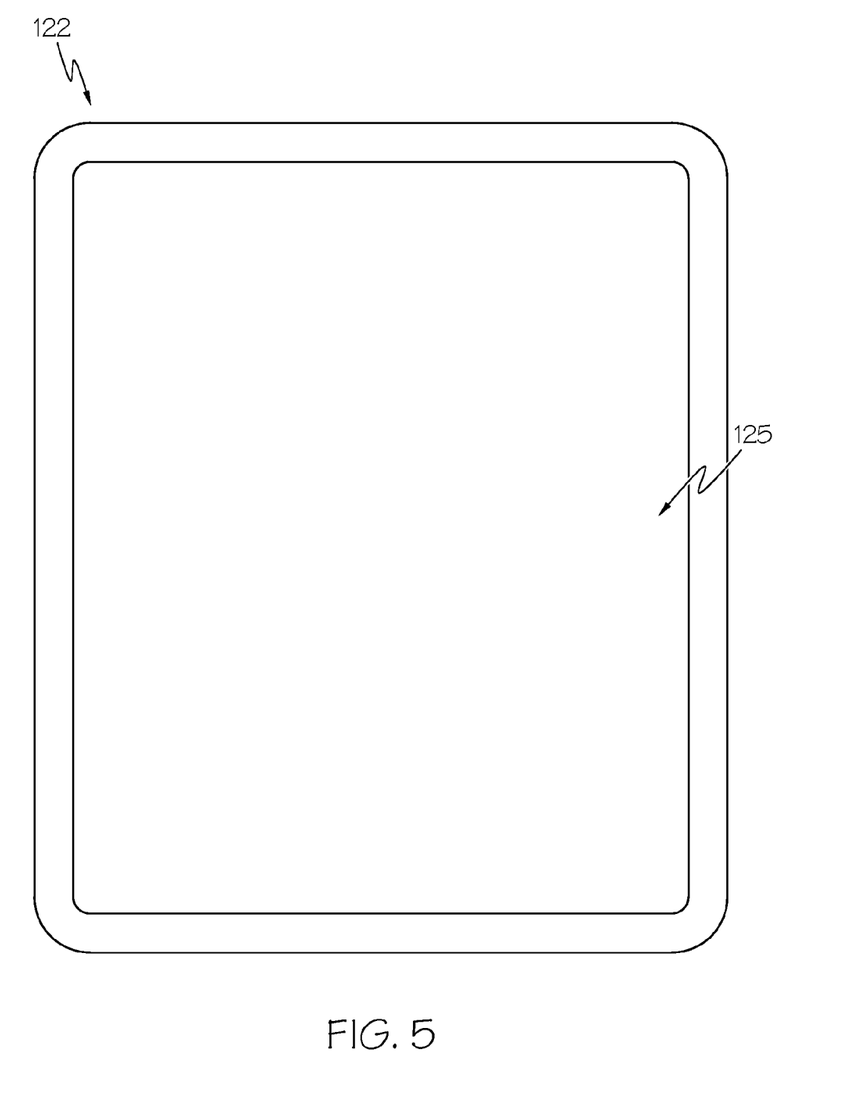
FIG. 5 schematically depicts a glass spacer frame according to one embodiment shown and described herein.

Referring now to FIGS. 4A and 4B, another embodiment of a touch screen assembly 100b is schematically depicted. In this embodiment, the touch screen assembly 100b includes a sealing glass 102, a backplane glass 106, a frit seal 110, an array of MO-TFTs 108, an index-matching gel 114, and a plurality of touch sensor electrodes 116, as described hereinabove with respect to FIGS. 2A and 2B. However, in this embodiment, the touch screen assembly further includes a circular polarizer 120. The circular polarizer is attached to the underside 132 of the sealing glass 102 such that the plurality of touch sensor electrodes 116 are positioned between the circular polarizer 120 and the underside of the sealing glass 102. The circular polarizer 120 prevents reflections from the backplane glass from reflecting through the sealing glass 102. The circular polarizer 120 has a thickness on the order of 100 μm which necessitates increasing the thickness of the frit seal 110 to accommodate for the added thickness of the circular polarizer.

However, increasing the thickness of the frit seal 110 may lead to incomplete processing of the frit seal 110 and, ultimately, failure of the seal. Accordingly, in some embodiments, a glass spacer frame 122 may be positioned along the perimeter of the backplane glass 106 to act as a filler material. The glass spacer frame 122 has a continuous outer perimeter with an open central area 125 (FIG. 5) such that the device surface of the backplane glass 106 is exposed through the glass spacer frame when the glass spacer frame 122 is positioned on the backplane glass 106. The glass spacer frame 122 is sealed to the backplane glass 106 with frit seal 123 and sealed to the sealing glass 102 with frit seal 110. Incorporation of the glass spacer frame 122 accommodates the addition of the circular polarizer 120 and maintains the desired hermeticity of the touch screen assembly. In the embodiments described herein, the glass spacer frame 122 is formed from a glass which has a coefficient of thermal expansion $CTE_f$ which is within $+/-15.0 \times 10^{-7}/°$ C. of $CTE_2$ or even within $+/-10.0 \times 10^{-7}/°$ C. of $CTE_2$.

In embodiments where the touch screen assembly 100b includes a circular polarizer 120, the row or column touch sensor electrodes may be formed on the underside 132 of the sealing glass 102 while the complimentary touch sensor electrodes (i.e., column or row electrodes) are formed on the underside of the polarizer (i.e., the surface of the circular polarizer 120 facing the backplane glass 106). In this embodiment, the polarizer acts as an insulator between the row and column touch screen electrodes.

Referring again to FIGS. 2A and 2B, the embodiments of the touch screen display assembly may be formed by depositing the array of MO-TFTs 108 on the device surface 140 of the backplane glass 106. A mask is first applied to the device surface 140 to define the array of MO-TFTs 108 and the MO-TFT material is deposited under vacuum using plasma enhanced chemical vapor deposition (PECVD) and/or sputtering. After deposition of the MO-TFT material, the mask is removed from the device surface.

The array of OLED devices 112 are then deposited on the array of MO-TFTs 108 such that the array of OLED devices 112 is electrically coupled to the array of MO-TFTs 108. The array of OLED devices 112 may be deposited on the MO-TFT using vacuum thermal evaporation techniques.

In embodiments of the touch screen assembly which include an optional perimeter frit 118, the perimeter frit is deposited as a paste on the underside 132 of the sealing glass and, thereafter, the sealing glass 102 is baked to cure the perimeter frit 118. In a separate step, the touch sensor electrodes 116 are deposited on the underside 132 and (optionally) the top surface 130 of the sealing glass 102 by sputtering and/or printing.

As noted hereinabove, some embodiments of the touch screen assemblies may optionally utilize a color filter positioned on the underside of the sealing glass. In these embodiments, the color filter material is deposited over the touch sensor electrodes using spinning techniques or doctor blade techniques. Following application of the color filter material, the material is cured in an oven.

Further, in embodiments which include a circular polarizer 120 as shown in FIGS. 4A-4B, the circular polarizer 120 is attached to the underside 132 of the sealing glass 102 such that the touch sensor electrodes 116 are positioned between the circular polarizer 120 and the underside 132 of the sealing glass 102 (FIGS. 4A-4B).

In embodiments which include a circular polarizer 120 as shown in FIGS. 4A-4B, a bead of frit paste is applied to the glass spacer frame 122 is applied to the underside of the glass spacer frame 122 and the glass spacer frame 122 is positioned on the device surface 140 of the backplane glass 106 such that the frit paste is positioned between the glass spacer frame 122 and the backplane glass 106. The frit paste is then irradiated by directing a laser beam through one or both of the glass spacer frame 122 or the backplane glass 106 to solidify the frit paste thereby bonding and hermetically sealing the backplane glass 106 to the spacer frame 122.

Once the various components have been formed on the underside 132 of the sealing glass 102 and the device surface 140 of the backplane glass 106, a frit paste is applied around the perimeter of the device surface 140 of the backplane glass 106. In embodiments where a glass spacer frame is utilized, the frit paste is applied to a top surface of the glass spacer frame. In embodiments where a glass spacer frame is not utilized, the frit paste is applied directly to the device surface 140 of the backplane glass 106. The index-matching gel 114 is positioned over the components deposited on the device surface 140 of the backplane glass. Thereafter, the sealing glass 102 is aligned on the backplane glass 106 and the assembly is placed under vacuum. The frit paste is then irradiated by directing a laser beam through one or both of the sealing glass 102 or the backplane glass 106 to solidify the frit paste thereby bonding the backplane glass 106 to the sealing glass 102 and hermetically sealing the components of the touch screen assembly.

In the embodiments of the touch screen assembly described herein, the touch screen assembly may have a thickness T which is less than 2 mm or even less than 1.5 mm. For example, in some embodiments, the thickness T of the touch screen assembly may be less than or equal to 1 mm. Such touch screen assemblies may be readily incorporated in a variety of electronic devices and are especially well suited to portable electronic device due to the decreased thickness of the assembly.

Figure 6:
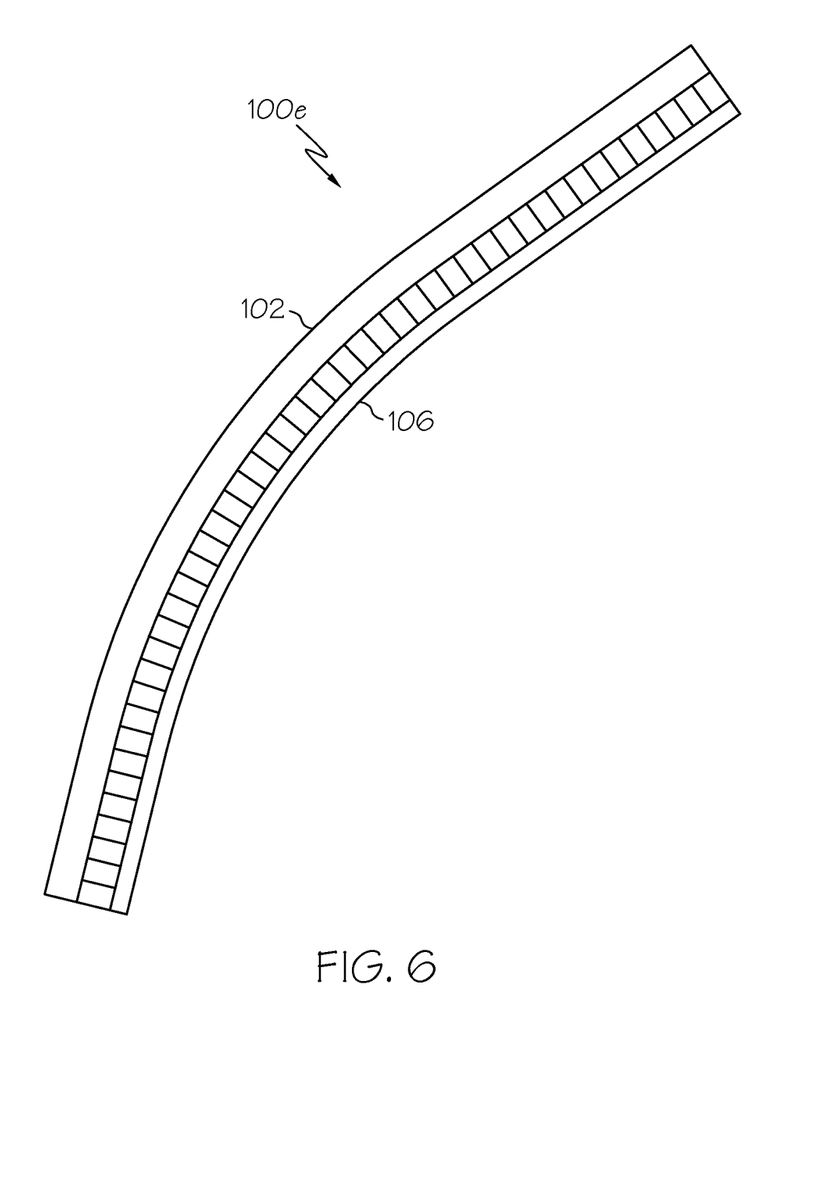
FIG. 6 schematically depicts one embodiment of a touch screen assembly which is formed utilizing a curved sealing glass.

Referring now to FIG. 6, one embodiment of a touch screen assembly 100e is schematically depicted. In this embodiment, the sealing glass 102 is formed with a radius of curvature while the backplane glass 106 is initially planar. Once the various components of the touch screen assembly have been deposited on the sealing glass 102 and the backplane glass 106, the backplane glass 106 is conformed to the shape of the sealing glass 102 by applying pressure to the assembly during the sealing process resulting in a touch screen assembly 100e with a radius of curvature.

It should now be understood that the touch screen assemblies described herein have improved mechanical strength and damage tolerance while also having reduced thickness relative to conventional touch screen panels. The improved mechanical properties and reduced thickness are achieved by using an ion-exchange strengthened sealing glass which is directly bonded to an ion-exchangeable backplane glass. The use of ion-exchange strengthened and ion-exchangeable glass is facilitated by the use of MO-TFTs on the backplane glass such that the coefficient of thermal expansion of the sealing glass, the backplane glass and the MO-TFTs are similar, thereby reducing the differential expansion between the materials during processing and subsequent use.

Moreover, due to the improved mechanical properties of the touch screen assemblies and reduced thickness, the touch screen assemblies are well suited for use in various electronic devices and particularly well suited for use in portable electronic devices. Further, the backplane glass of the touch screen assemblies described herein may be significantly thinner than the sealing glass which facilitates the production of touch screen assemblies which deviate from the conventional planar assembly, thereby affording electronic device manufacturers greater flexibility in design.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A touch screen assembly for an electronic device, the touch screen assembly comprising:
    a sealing glass comprising ion-exchange strengthened glass having a first coefficient of thermal expansion $CTE_1$, and a plurality of touch sensor electrodes formed on at least an underside of the sealing glass opposite a face of the sealing glass;
    a backplane glass comprising ion-exchangeable glass having a device surface, an underside and a second coefficient of thermal expansion $CTE_2$, wherein $CTE_2$ is within $+/-15.0\times10^{-7}/°$ C. of $CTE_1$ and the device surface of the backplane glass is bonded and hermetically sealed to the underside of the sealing glass with a frit seal, the frit seal enclosing a device area between the underside of the sealing glass and the device surface of the backplane glass;
    an array of metal oxide thin film transistors deposited on the device surface of the backplane glass in the device area; wherein the array of metal oxide thin film transistors have a third coefficient of thermal expansion $CTE_3$ which is within $+/-15.0\times10^{31\ 7}/°$ C. of $CTE_2$; and
    an array of OLED devices formed over the array of metal oxide thin film transistors in the device area on the device surface of the backplane glass.

2. The touch screen assembly of claim 1, wherein the sealing glass has a depth of layer of at least 30 μm and a compressive stress greater than or equal to 500 MPa.

3. The touch screen assembly of claim 1, wherein the array of metal oxide thin film transistors have a third coefficient of thermal expansion $CTE_3$ which is within $+/-10.0\times10^{-7}/°$ C. of $CTE_2$.

4. The touch screen assembly of claim 1, wherein the sealing glass has a first thickness $T_1$ from about 0.5 mm to about 0.7 mm and the backplane glass has a second thickness $T_2$ less than or equal to about 0.1 mm.

5. The touch screen assembly of claim 1, wherein $CTE_2$ is within $+/-10.0\times10^{-7}/°$ C. of $CTE_1$.

6. The touch screen assembly of claim 1, wherein $CTE_1$ is the same as $CTE_2$.

7. The touch screen assembly of claim 1, wherein the sealing glass and the backplane glass are alkali-alumino silicate glasses.

8. The touch screen assembly of claim 1, wherein at least the device surface of the backplane glass is dealkalized.

9. The touch screen assembly of claim 1, wherein the backplane glass is a laminate glass comprising an alkali containing glass core positioned between upper and lower alkali-free glass claddings such that the device surface and the underside of the backplane glass are alkali-free.

10. The touch screen assembly of claim 1, further comprising a circular polarizer attached to the underside of the sealing glass such that the plurality of touch sensor electrodes are positioned between the circular polarizer and the underside of the sealing glass.

11. The touch screen assembly of claim 10 further comprising a glass spacer frame hermetically sealed to the device surface of the backplane glass.

12. The touch screen assembly of claim 1, further comprising a perimeter frit deposited adjacent to a perimeter of the underside of the sealing glass, wherein the perimeter frit is hermetically sealed to the underside of the sealing glass and the frit seal.

13. A touch screen assembly for an electronic device, the touch screen assembly comprising:
    a sealing glass formed from ion-exchange strengthened alkali-alumino silicate glass having a first coefficient of thermal expansion $CTE_1$, and a plurality of touch sensor electrodes formed on at least an underside of the sealing glass opposite a face of the sealing glass;

a backplane glass formed from alkali-alumino silicate glass having the same composition as the sealing glass, the backplane glass having a device surface which is free of alkali ions and an underside, wherein the device surface of the backplane glass is bonded and hermetically sealed to the underside of the sealing glass with a frit seal, the frit seal enclosing a device area between the underside of the sealing glass and the device surface of the backplane glass;

an array of metal oxide thin film transistors deposited on the device surface of the backplane glass in the device area; and an array of OLED devices formed over the array of metal oxide thin film transistors in the device area on the device surface of the backplane glass.

14. The touch screen assembly of claim 13, wherein the device surface and an underside of the backplane glass are dealkalized.

15. The touch screen assembly of claim 13, wherein the backplane glass is a laminate glass comprising an alkali glass core positioned between upper and lower alkali-free glass claddings such that the device surface and the underside of the backplane glass are alkali-free.

16. The touch screen assembly of claim 13, further comprising:

a circular polarizer attached to the underside of the sealing glass such that the plurality of touch sensor electrodes are positioned between the circular polarizer and the underside of the sealing glass; and a glass spacer frame hermetically sealed to the device surface of the backplane glass.

17. The touch screen assembly of claim 13, wherein the backplane glass has a second coefficient of thermal expansion $CTE_2$, wherein $CTE_2$ is within $+/-15.0 \times 10^{-7}/°$ C. of $CTE_1$.

18. The touch screen assembly of claim 17, wherein $CTE_1$ is the same as $CTE_2$.

19. A touch screen assembly for an electronic device, the touch screen assembly comprising:

a sealing glass comprising ion-exchange strengthened glass having a depth of layer of at least 30 μm, a compressive stress greater than or equal to 500 MPa, and a first coefficient of thermal expansion $CTE_1$;

a backplane glass a device surface, an underside and a second coefficient of thermal expansion $CTE_2$, wherein $CTE_2$ is within $+/-15.0 \times 10^{-7}/°$ C. of $CTE_1$ and the device surface of the backplane glass is bonded and hermetically sealed to the underside of the sealing glass with a frit seal, the frit seal enclosing a device area between the underside of the sealing glass and the device surface of the backplane glass; and an array of metal oxide thin film transistors deposited on the device surface of the backplane glass in the device area, wherein the array of metal oxide thin film transistors have a third coefficient of thermal expansion $CTE_3$ such that $CTE_3$ is within $+/-15.0 \times 10^{-7}/°$ C. of $CTE_2$.

* * * * *